Oct. 13, 1931.  M. SOSS  1,827,116
LAWN MOWER
Filed Jan. 22, 1929   2 Sheets-Sheet 1
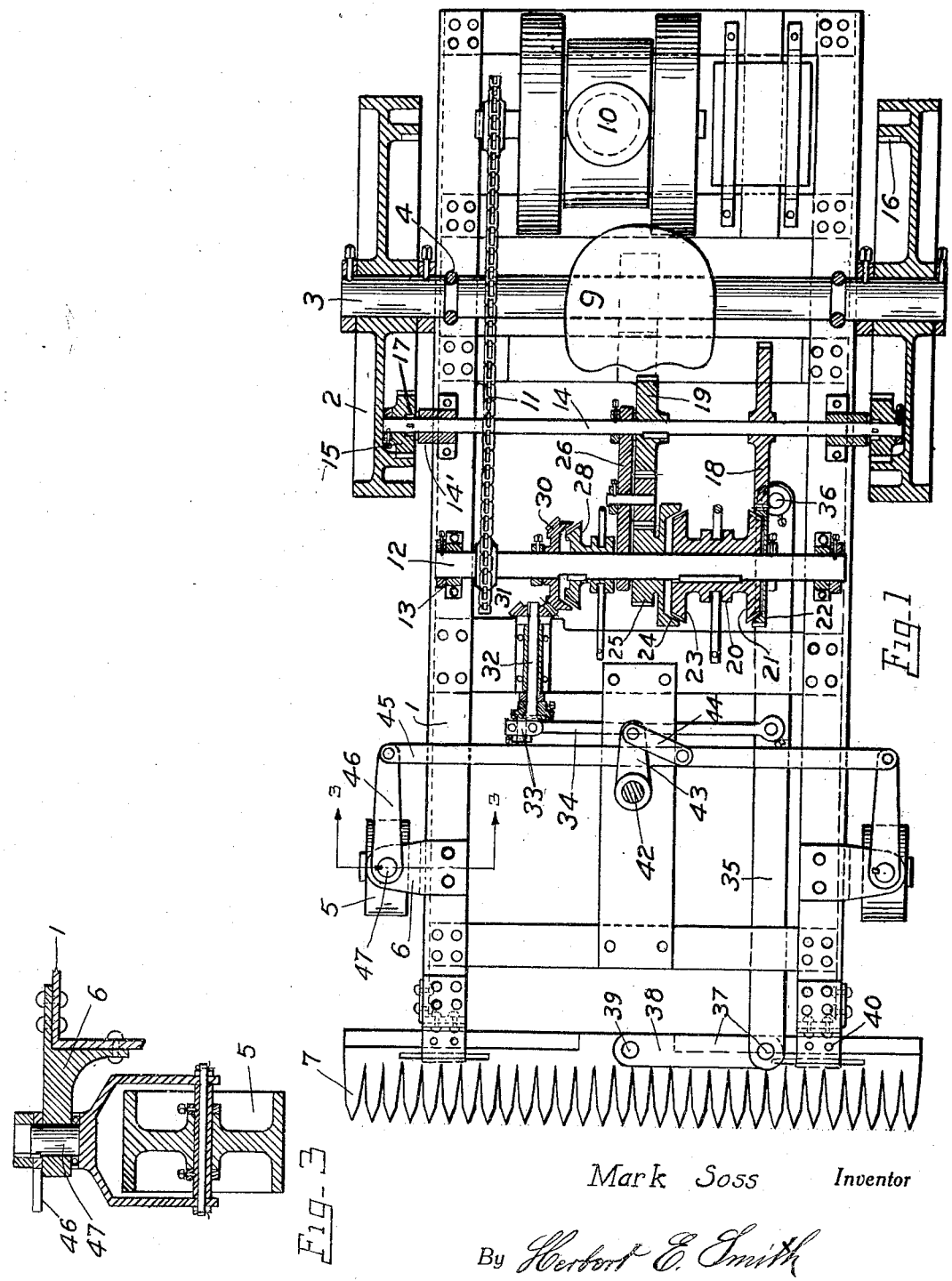
Mark Soss   Inventor
By Herbert E. Smith
Attorney

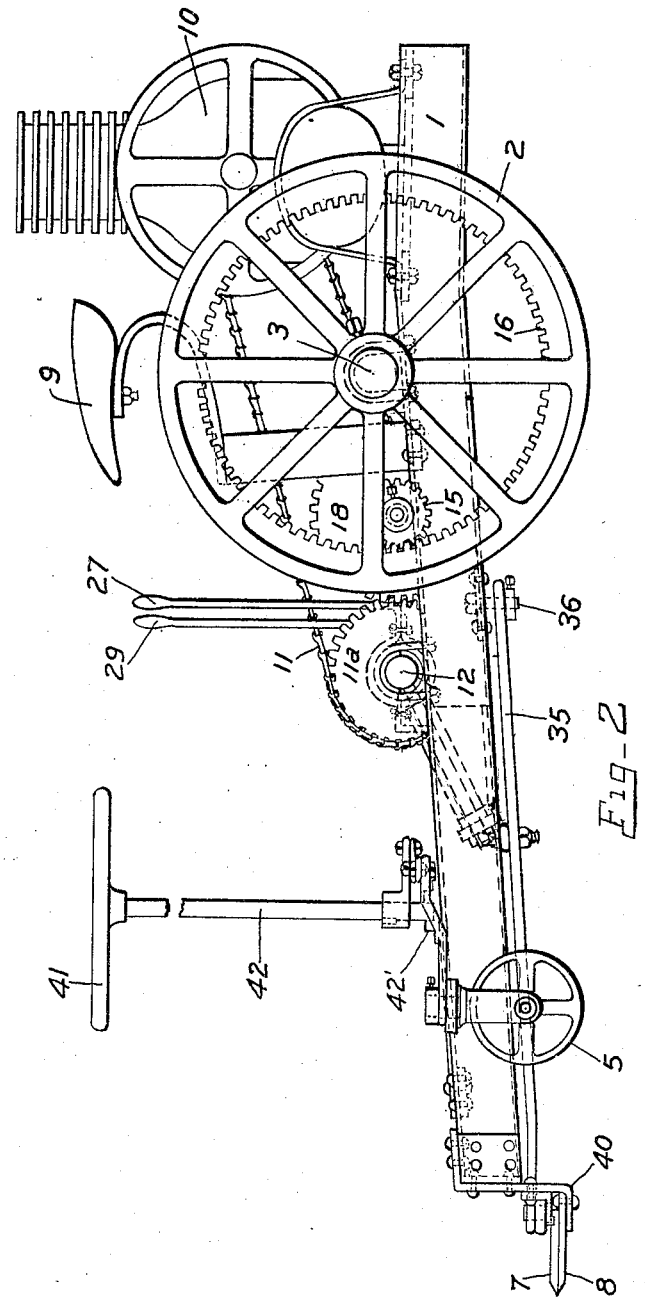

Patented Oct. 13, 1931

1,827,116

UNITED STATES PATENT OFFICE

MARK SOSS, OF SPOKANE, WASHINGTON

LAWN MOWER

Application filed January 22, 1929. Serial No. 334,244.

My present invention relates to improvements in lawn movers of the power operated and self propelled type utilizing a transversely arranged reciprocating cutter blade and complementary fixed cutter bar located at the front end of the machine, and designed especially for the purpose of operating in spaces of restricted area on the lawn that are usually inaccessible to the ordinary lawn mover.

The primary object of my invention is the provision of an automotive vehicle or implement of this character which may be propelled with convenience, steered with facility by the driver of the implement who rides on the machine, and which operates with smoothness and efficiency in the performance of its functions.

The invention consists in certain novel combinations and arrangements of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a plan view, with parts in horizontal section, of an implement embodying my invention.

Figure 2 is a view in side elevation of the implement.

Figure 3 is an enlarged detail sectional view of one of the front steering wheels.

In carrying out my invention I utilize a usual type of rectangular frame 1 that declines slightly from the rear to the front of the implement, and is supported at the rear by the two traction-drive wheels 2 that are used in the propulsion of the implement. The wheels are journaled on the ends of an axle 3 secured at 4 to the frame, and at the front of the implement are a pair of swiveled steering wheels 5 carried in brackets 6 and operated as will be hereinafter set forth.

The cutter or cutting mechanism is located at the extreme front of the implement and comprises the horizontally disposed, top reciprocating cutter blade 7, with the usual teeth projecting therefrom and the lower, fixed, complementary cutter bar 8 over which the cutter blade slides.

The driver occupies a seat 9 located in position so that access may readily be had to the controlling devices for the implement, and a motor 10, here shown as a gasoline motor, is located at the rear of the axle to counterbalance the weight of the operating parts of the implement at the forward end or front of the machine.

Power is transmitted from the motor through a chain drive including the sprocket chain 11 and wheel 11a, the latter on the transversely arranged power shaft 12, journaled in bearings 13 in front of the axle 3, and parallel therewith. Between the power shaft and the axle is located the driving shaft 14, journaled in bearings 14' parallel with the axle, and at the ends of the drive shaft are driving pinions 15 that co-act with internal gear rings 16 on the two traction wheels 2. Ratchet drive devices 17 are used between the pinions and the driving shaft to insure forward and reverse drive for the wheels, and also to permit a slip action or differential movement of the off wheel when the implement is making a turn or rounding a curve.

In connection with the propelling mechanism a double driving clutch is utilized on the power shaft for the driven gears 18 and 19 on the propeller shaft, gear 18 receiving power for the forward drive and gear 19 receiving power for the reverse drive. A clutch sleeve 20 is keyed to slide on the power-shaft, and a head 21 is adapted to frictionally engage the complementary cupped clutch member 22 which has a toothed periphery for meshing with the forward drive gear 18. A head 23 at the opposite end of this clutch sleeve is adapted to frictionally engage the loose friction member 24 which is rigid with the gear 25, and the latter meshes with the intermediate gear 26 that drives the reverse drive gear 19 on the propeller shaft.

The slide sleeve or member of this double clutch is manipulated through the instrumentality of the hand lever 27 that is conveniently located, for access by the driver who sits in the seat 9.

The cutter mechanism 7—8 is also operated from the power shaft 12 which is provided with a sliding clutch member 28 that may be operated by the use of the control lever 29 located adjacent the other clutch or control lever 27. The complementary loose clutch member 30 has a gear ring which meshes with a complementary bevel pinion 31 rotatable with an eccentric shaft 32 that is journaled in front of the power shaft and at right angles thereto. At its forward end the eccentric shaft has an eccentric 33 that operates a transversely disposed pitman 34, and the latter is pivotally connected to the cutter operating lever 35. This lever extends longitudinally of the implement and at its rear end is pivoted at 36 on a suitable support so that it may be oscillated in a horizontal plane by the action of the eccentric and its pitman.

At its forward end the cutter operating lever 35 is pivoted as at 37 to the link 38 which is pivoted at 39 to the cutter blade 7, and the blade reciprocates in suitable guides 40 at the forward end of the frame 1.

By manipulation of the lever 29 it will be apparent that the cutting mechanism may be thrown into and out of commission through the action of the clutch device on the power shaft, and when the clutch is closed the rotary power of the power shaft is transmitted through the intermediate mechanism and converted into the reciprocating movement of the cutter blade on its bar for the purpose of mowing the grass. The cutter thus projects forward of the extreme front of the frame 1 and the cutting mechanism may be entered into small or restricted areas for the purpose of cutting the grass without obstruction from any parts of the implement. The two levers 27 and 29 are readily accessible for control of the propelling mechanism and cutting mechanism, respectively, and a steering wheel 41 is also located in convenient position for the driver of the implement in order that he may have entire control of the operations of the implement with very little exertion.

The steering wheel 41 is carried at the top of the steering shaft 42 which is suitably journaled to turn in bearings in the center plate 42' of the frame, and on the shaft is carried a crank arm 43 which is connected by the pivoted link 44 to the cross rod 45 of the steering mechanism, the rod extending transversely of the implement and projecting beyond the opposite sides of the frame.

By means of two lever arms 46, which at their free ends are pivoted at the opposite ends of the cross rod, the latter is connected with the wheel spindles 47 that are swiveled in the castings or brackets 6 bolted or riveted at the sides near the front of the main frame.

The swiveled steering wheels are readily manipulated through the turning of the steering wheel 41, and the ratchet drive connections for the traction wheels 2 also provide means for facilitating the maneuvers of the implement so that the latter may make short turns, enter into small grass plots and back out of them when trimming the lawn, and accomplish all movements with workmanlike precision and smoothness.

While I have illustrated one complete exemplification of my invention in the drawings, it will be understood that changes and alterations may be made in the structure of the drawings within the scope of my claim without departing from the principles of my invention.

Having thus fully described my invention, what I claim as new and desire to secure by Letters Patent is:—

The combination in a lawn mower with a motor, a sprocket driving mechanism operated by the motor, a power shaft journaled transversely of the mower and operated by the driving mechanism, and a reciprocable cutter at the forward end of the mower, of an oscillating lever having an intermediate pivot on and extending longitudinally of the mower, said lever having a pivotal connection at its forward end to the reciprocable cutter, a driving clutch on the power shaft, eccentric transmission mechanism actuated by said clutch, and a pitman connecting the eccentric mechanism and the rear end of the oscillating lever.

In testimony whereof I affix my signature.

MARK SOSS.